United States Patent [19]
Guzzo

[11] 3,865,529
[45] Feb. 11, 1975

[54] MOLDING APPARATUS

[75] Inventor: Francesco Guzzo, Melrose Park, Ill.

[73] Assignee: Beatrice Foods Co., Chicago, Ill.

[22] Filed: Dec. 5, 1973

[21] Appl. No.: 421,779

[52] U.S. Cl. ............ 425/249, 425/438, 425/DIG. 5, 425/DIG. 58, 249/63, 249/180, 249/184
[51] Int. Cl. ............................ B29c 1/00, B29f 1/00
[58] Field of Search .......... 249/63, 66, 67, 68, 178, 249/180, 184, 186, 152, 59; 425/247, 249, 438, DIG. 5, DIG. 58

[56] References Cited
UNITED STATES PATENTS

| | | | |
|---|---|---|---|
| 2,327,665 | 8/1943 | Peat | 425/DIG. 58 |
| 2,366,475 | 1/1945 | Bartholomew | 425/DIG. 58 |
| 2,948,031 | 8/1960 | Webb | 425/DIG. 58 |
| 3,279,740 | 10/1966 | Long | 249/184 |
| 3,339,242 | 9/1967 | Lamb | 249/59 |
| 3,373,460 | 3/1968 | Lodney | 425/DIG. 58 |

FOREIGN PATENTS OR APPLICATIONS

| | | | |
|---|---|---|---|
| 175,650 | 6/1961 | Sweden | 425/DIG. 5 |
| 1,351,065 | 12/1963 | France | 425/DIG. 58 |
| 1,244,379 | 7/1967 | Germany | 249/180 |
| 2,049,960 | 3/1971 | France | 249/180 |

*Primary Examiner*—J. Howard Flint, Jr.
*Attorney, Agent, or Firm*—James P. Humes

[57] ABSTRACT

An injection mold is disclosed for manufacture of a polygonal plastic article having plural side walls, a closed bottom wall and a constricted top opening. A mold core structure corresponds to the interior surface contour of the article in a mold defining position but is collapsible for withdrawal from the constricted top opening. The core includes a generally frusto-pyramidal central segment, and plural side wall and corner segments slidable along the inclined walls of the central segment. Preferred angular relationships of the corner and side wall segments and the slides of the central segment are also disclosed.

6 Claims, 9 Drawing Figures

Line (a) is Parallel to Line (b)

3,865,529

MOLDING APPARATUS

INTRODUCTION

The present invention relates generally to injection molding apparatus for the manufacture of plastic articles. More particularly, the invention is directed to a new and improved mold structure for making polygonal plastic articles having a closed bottom wall and a constricted top opening through which the core section of the mold must be withdrawn following molding of the article.

SUMMARY OF THE INVENTION

The present invention provides a collapsible core structure for injection molding of plastic articles which core structure has particular utility in the molding of polygonal enclosures having an inwardly turned flange adjacent a top opening of the article. Assuming that the width of the flange is uniform along each side wall of the article, the diagonal of the flange at each internal corner of the article is of a somewhat greater dimension. Accordingly, in collapsing a core structure for removal from such a molded article, it is necessary that the corner portions of the core move inwardly a greater distance in the same vertical length of travel as the side wall segments.

The present invention provides a mold core structure that fully satisfies the requirements noted above and which yet is of a simple and economical yet highly reliable design. Additionally, the invention provides an optimum relation between the multiple elements defining the mold core so that a minimum relative vertical movement of a central element of the core relative to a multiple peripheral elements is required to provide the requisite inner movement or collapsing of the peripheral core dimension.

The core elements also are controlled in their relative movements by linkage elements which are arranged to assure that the relative longitudinal movement of each of the peripheral elements is constant despite a disparity in the length of lateral movement of these elements.

Accordingly, the invention is directed to an injection mold for manufacture of a plastic article having a bottom wall and a plurality of side wall portions forming a generally hollow polygonal enclosure with an inwardly extending flange portion adjacent an open top of the article, thereby to constrict the top opening. Specifically, the mold comprises a first mold means having a mold defining surface corresponding to the exterior surface dimensions of at least a portion of the article. The mold further comprises a second mold means having a mold defining surface corresponding to the interior surface dimensions of the article and comprising a generally frusto-pyramidal central member having a plurality of side wall portions of a predetermined slope and corresponding in number to the plurality of article side walls. The second mold means also is provided with a plurality of corner wall portions located intermediate respective pairs of the central member side wall portions with the corner wall portion having a lesser slope than the side wall portions. There is additionally included in the second mold means side wall segments slidably movable along respective ones of each of the side wall portions and corner wall segments slidably movable along respective ones of the corner wall portions. The side and corner wall segments are each movable from respective mold defining positions in which the segments cooperate with the central member to form a mold defining surface of the second mold means and a collapsed position in which the side and corner wall segments are displaced relative to the central member so that the second mold means is sufficiently reduced in size to permit it to be withdrawn from the constricted top opening of the molded plastic article. Other features including an optimum relationship of the mold segments is disclosed hereinafter.

BRIEF DESCRIPTION OF THE DRAWINGS

The novel features of the present invention are set forth with particularity in the appended claims. The invention together with further objects and advantages thereof may best be understood, however, by reference to the following description taken in conjunction with the accompanying drawings in the several figures of which like reference numerals identify like elements and in which:

DESCRIPTION OF THE PREFERRRED EMBODIMENTS

Figure 1:
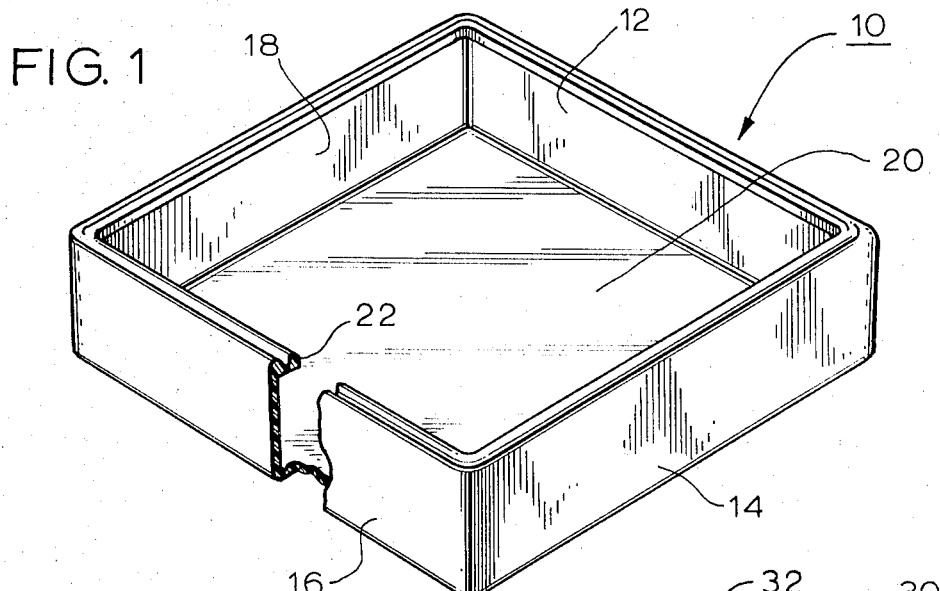
FIG. 1 is a perspective view of a molded plastic article manufactured by the mold apparatus of the present invention.

Referrring now to FIG. 1 of the drawings, there is shown a molded plastic article 10 manufactured by the mold apparatus of the invention presently to be described. The article 10 is a generally hollow polygonal enclosure including four side walls, 12 14, 16 and 18, a closed bottom wall 20 and an open top. An inwardly extending flange portion 22 integral with the side walls is dipsosed above the circumference of the article adjacent its open top to form a constricted top opening. The plastic article 10 is a prismatic lens cover for a ceiling light fixture. However, as will presently be understood, the teachings of the present invention are applicable to manufacture of a wide range of plastic polygonal articles having constricted top openings through which the interior surface defining components of the mold must be withdrawn in order to eject a finished article from the mold.

Figure 2:
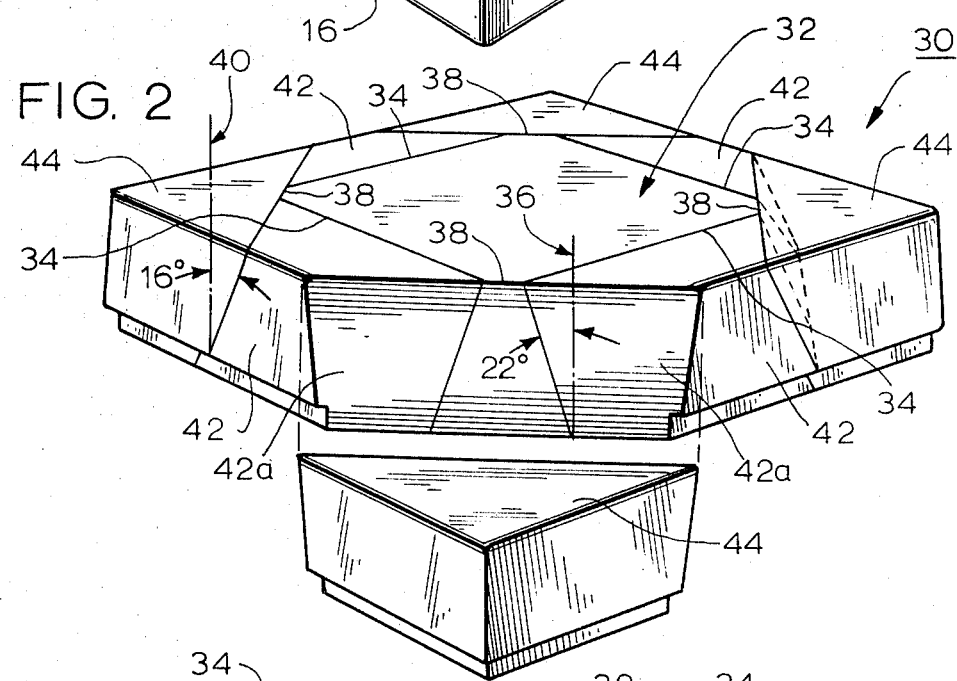
FIG. 2 is a semi-schematic illustration of the structure of the mold core.
Figure 3:
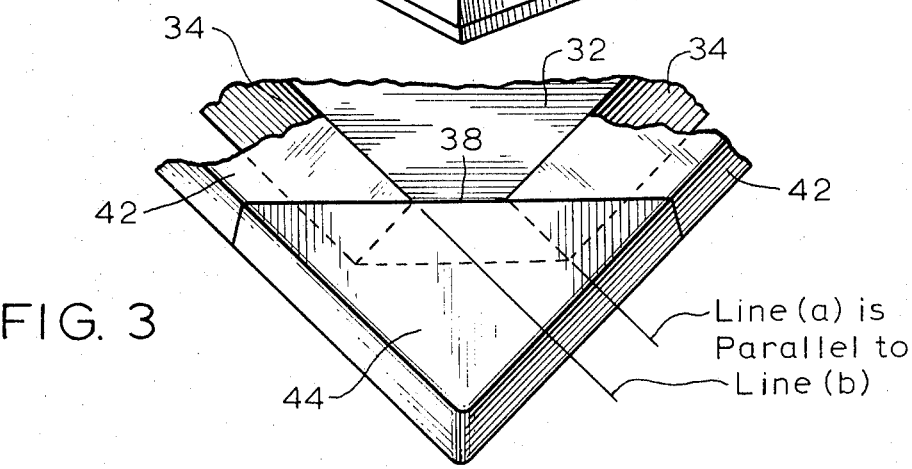
FIG. 3 is a detailed view of a portion of the mold core structure of FIG. 2.

Referring now to FIG. 2, a portion of the injection mold apparatus of the present invention, namely, a collapsible core mold means 30 that defines the interior surface contour of the molded article 10, is illustrated in a semi-schematic fashion. The exterior surface defining portion as well as further structural refinements of the mold will presently be described. Specifically, core mold means 30 provides in its closed position of FIG. 2 a mold defining surface corresponding to the interior surface dimensions of the article 10 of FIG. 1. Basically the mold means 30 comprises a generally frusto-pyramidal central member 32 having a plurality of sloped side wall surface portions each generally designated in the drawings of FIGS 2 and 3 by the reference numeral 34. Each of the side wall portions 34 is inclined inwardly at a like predetermined angle to the vertical. In the present embodiment the side wall slope is approximately 22° as indicated by the angle designation between one of the side walls and the vertical reference line 36. The side wall portions 34 correspond in number to the number of side walls of the article 10 to be molded, in the present instance four.

The central member 32 further includes a plurality of corner wall portions each identified by the reference numeral 38 in the drawing and each located intermediate respective pairs of the side wall portions 34. In accordance with the present invention, the corner wall portions 38 each have an equal and predetermined lesser slope than the 22° slope of the side wall portions 34. In the present embodiment, each of the corner wall portions 38 forms an approximately 16° angle with the vertical as denoted in the drawing by the designated angle between one of the corner walls and a vertical reference line 40.

The core mold means 30 includes a plurality of side wall segments that are slidably movable along respective ones of each of the side wall surface portions 34 of the central member 32. The core mold means 30 further includes four corner wall segments 44 slidably movable along respective ones of said corner wall surface portions 38 and the similarly inclined edge portions of the adjacent side wall segments 42. In FIG. 2, the exemplary forwardmost corner wall segment 44 slides along the inclined plane defined by the adjacent corner wall portion 38 and the co-planer surfaces 42a of the adjacent side wall segments 42.

The central member 32, the four side wall segments 42 and the four corner wall segments 44 cooperatively define in an assembled relation shown generally in FIG. 2, a surface contour corresponding to the interior surface dimensions of the molded plastic article 10. As will presently be explained, each of the side wall segments 42 and the corner wall segments 44 are movable in uninson relative to the fixed central member 32 along the inwardly inclined slopes of the fixed member 32 to a position in which the mold core 30 is sufficiently reduced in size to permit it to be withdrawn from the constricted top opening of the plastic article 10. The mold core structure shown in FIG. 2 assures that the individual core components will not interfere with one another in movement between their mold defining position illustrated semi-schematically in FIG. 2 and their collapsed position presently to be described.

Furthermore, it is a feature of the present invention that the various segments be interrelated such that a minimum vertical travel of the side and corner wall segments relative to the central member 32 is needed to effect the necessary size reduction of the core to permit its withdrawal from the molded article 10. In this regard, it has been found that an essential condition for this result and to assure that the side and corner wall segments do not interfere with one another is that the slopes of the side walls 34 and the corner walls 38 of the central member 32 bear a specific angular relationship. Specifically, in accordance with the present invention, it is preferred that the planar projection of the line formed by the intersection of the side wall portion 34 and the corner wall portion 38 of the central member 32 define a line parallel to the line formed by the intersection of the adjacent side wall portion 34 and the planar top surface portion of the member 32. These lines are identified respectively as "Line (a)" "Line (b)" in FIG. 3.

Figure 4:
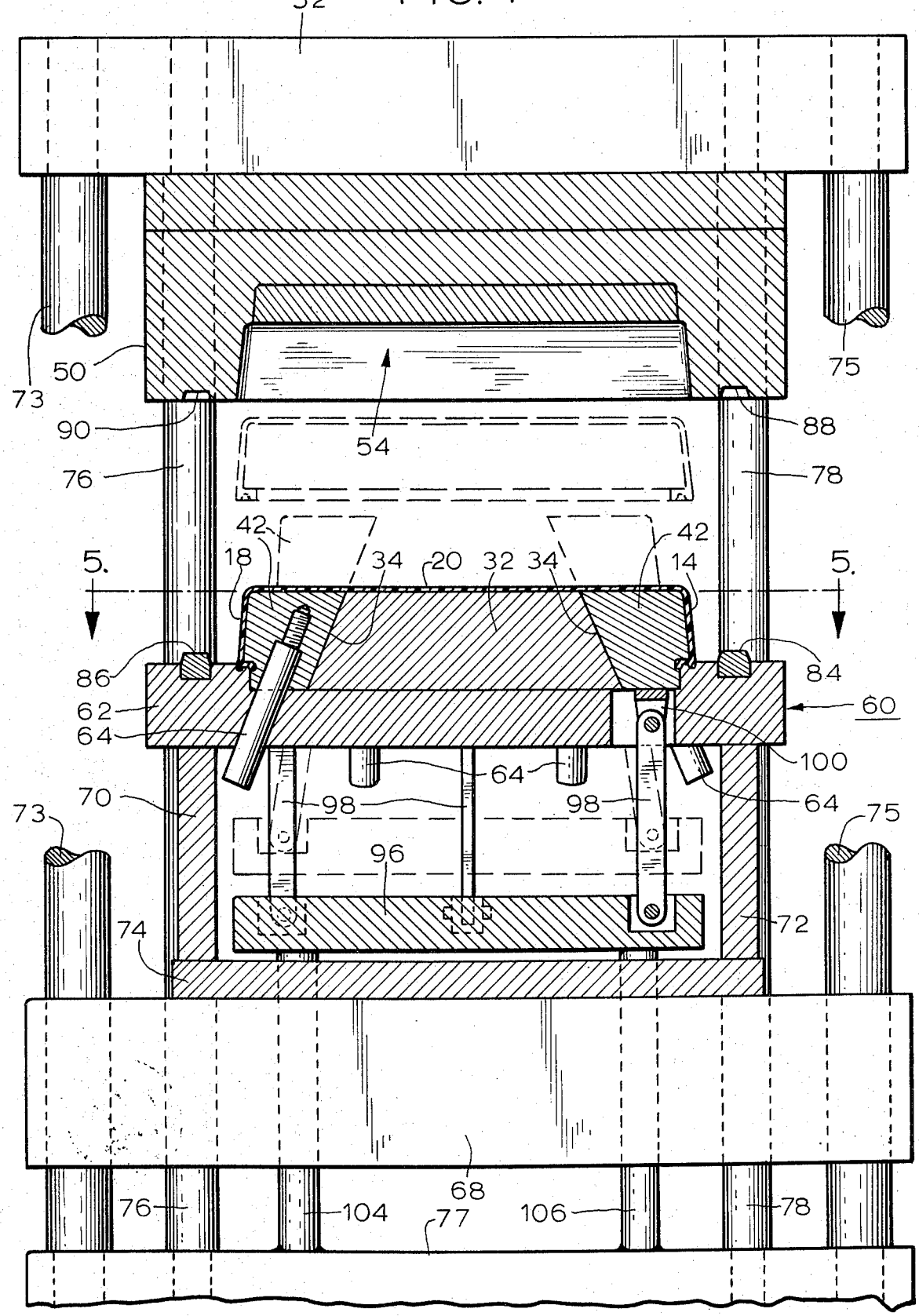
FIG. 4 is a longitudinal section view of the mold apparatus of the present invention.
Figure 5:
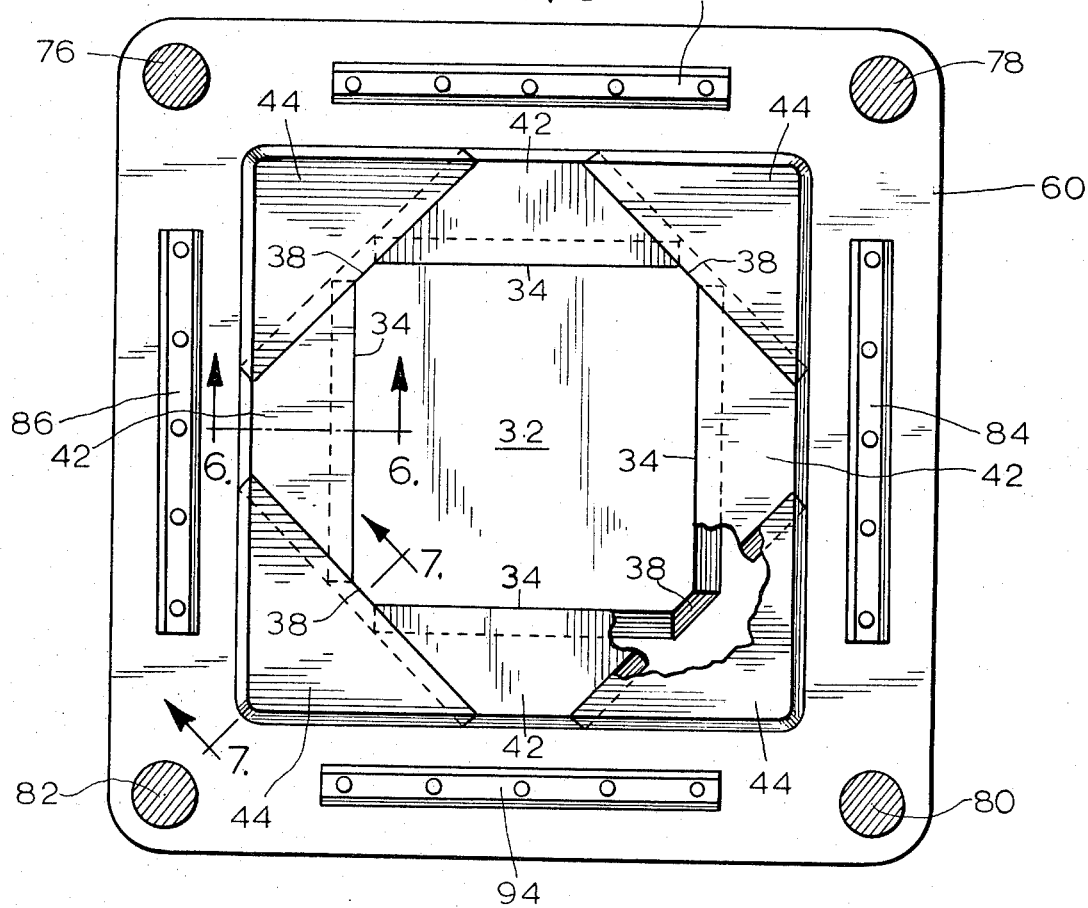
FIG. 5 is a cross-sectional view taken along lines 5—5 of FIG. 4.

The construction and operation of the entire mold structure may now be appreciated in further detail by reference to FIGS. 4–7. The mold is shown in FIG. 4 in a partially opened condition, in the course of movement to its fully opened condition, depicted in phantom outline. As also indicated in phantom outlind in FIG. 4, the article 10 is ejected from the mold by either manually or automatically lifting it clear of the core components thereby conditioning the mold for return movement to its closed position. Specifically, as shown in FIG. 4, a first mold means 50 is positioned with its planer backside fixedly secured to a stationery platen 52 of a conventional molding press (not shown). The first mold means 50 is an enlarged generally rectangular steel block having a recess 54 sculptured into the forward face thereof, i.e., the face opposite the platen 52, which recess forms a mold defining surface corresponding to the exterior surface dimensions of at least a portion of the article 10. In the present embodiment, the recess 54 corresponds to the exterior surface contour of the bottom wall 20 and each of the side walls 12, 14, 16 and 18 of the article 10.

The second mold means designated genreally by the reference numeral 60 includes the mold core structure previously depicted in the semi-schematic illustration of FIG. 2. For clarity and convenience, the constituent elements of the core mold structure in FIG. 4 are identified by like reference numerals as used for the corresponding components of FIG. 2. The lower or base portions of each of the constituent components of the core mold means 30 seat in the recessed face portion of a rectangular support plate 62. The frusto-pyramidal central member 32 is fixedly secured to the recessed planar surface of plate 62 while the side wall and corner wall components 42 and 44, respectively, are slidably movable along the inclined surfaces of the central member 32 from their closed or mold defining positions shown in FIG. 4 to open positions presently to be described.

Each of the side wall and corner wall components are guided in their paths of movement by respective pairs of guide posts. An exemplary one of these guide posts 64 for the left-hand side wall member 42 is visible in FIG. 4. The post 64 includes a threaded terminal portion secured in a threaded bore in the underside of the side wall member 42 and a rearwardly extending cylindrical guide portion journalled in an angulated bore of the support plate 62, the axis of the angulated bore being parallel to the path of movement of the side wall member 42. It will be recognized that the guide posts associated with each of the remaining side wall and corner members 42 and 44, respectively, are of a like construction.

The movement of each of the side wall and corner members of the core mold structure is controlled from mechanical linkage elements located behind the support plate 62. In order to accommodate a suitable range of movement of these linkage elements, a spacer structure is interposed between the support plate 62 and a movable support platen 68 of the molding press (not shown). The spacer structure comprises a rectangularly arrayed group of four spacer blocks of which blocks 70 and 72 are visible in the drawings. The spacer blocks 70, 72 and their counterparts not visible in the drawings are rigidly secured at one end to the backside of the support plate 62 and at their respective opposite ends to a backing plate 74 that is in turn fixedly secured to the movable platen 68.

As is well understood in the art, the moveable platen 68 to which the second mold means 60 is secured is carried on four rectangularly arrayed guide rails of the mold press, two of these rails 73 and 75 being visible in the drawings. The rails 73 and 75 and their counterparts not visible in the drawings each have one end fixedly secured in receiving bores of the stationary platen 52 and their respective opposite ends secured in receiving bores of a stationary backing plate 77 of the mold press. The platen 68 is slidably journalled on the four guide rails and is moveable between a pair of spaced positions in which the mold is respectively closed to permit molding and open to permit ejection of a molded article. The platen 68 is displaced between its open and closed position under the influence of a hydraulic ram (not shown) of the conventional hydraulic molding machine.

The second mold means 60 is guided between its opened and closed positions and maintained in proper registry with the first mold means 50 by a series of four cylindrical guide rods, two of which 76 and 78 are visible in the drawing. The guide rods 76 and 78 are secured at one end in receiving bores of the stationary mold means 50 and extend through guide bores in the second mold means 60 and the moveable platen 68. The remaining two guide posts 80 and 82 of the array are visible in FIG. 5, and as there shown define a rectangular array well within the perimeter of the array formed by the guide rails of platen 68.

Proper registry and secure interfit of the mold sections 50 and 60 upon mold closure is assured by provision of an interlock means. Specifically, the interlock means comprises a series of four elongated interlock bars secured to the mold means 62 in outwardly spaced and parallel relation to respective ones of the four side walls 42. Two of these interlock bars 84 and 86 are visible in FIG. 5, while the remaining two interlock bars 92 and 94 are visible in FIG. 5. Each of the interlock bars is of a generally trapezoidal cross-section and each of the interlock bars seats in an associated recess in the mold means 50, the contoured recesses 88 and 90 for interlock bars 84 and 86 being visible in FIG. 4.

As previously mentioned, the displacement of the mold core structure to a collapsed position to permit withdrawal of the core from the molded article 10 is effected by control mechanism located between the second mold member 62 and the backing plate 77. Specifically, the control mechanism comprises an ejection plate 96 located adjacent the backing plate 74 when the core mold elements are in their closed position as shown in FIG. 4. Each of the side wall components 42 and the corner wall components 44 are pivotally connected to the ejection plate 96 by respective linkage elements. An exemplary one of the similar linkage elements 98 for the side wall components 42 is visible on the right-hand side of FIG. 4. As there shown, the linkage element 98 is pivotally connected at one end to the ejection plate 96 and at its opposite end is pivotally connected to a depending tab 100 affixed to the underside of the side wall component 42. Each of the side wall components 42 moves along a similarly inclined surface 34 of the fixed central core member 32. Thus, each incremental unit of movement of the ejection plate 96 results in equal lateral and longitudinal movement components of the side wall members 42.

On the other hand, it will be recalled that the corner wall components move along inclined side wall portions 38 of a lesser slope than the side walls 34. It is, of course essential that the four corner wall components 44 move at a like longitudinal rate as the side wall components 42 in order to avoid shearing of the molded article 10. To this end, the linkage elements associated with the corner walls 44 are interconnected to the ejection plate 96 such that the longitudinal movement of the corner wall members 44 is equal to that of the side wall members 42 for a given incremental movement of the ejection plate 96. Those skilled in the art will recognize that an equality in the longitudinal movement of the differently sloped side and corner wall segments may be effected by appropriately angulating the longitudinal axes of the linkages.

The ejection plate 96 is actuated at the appropriate moment during travel of the second mold means 60 to its open position by means of a pair of stationary rods 104, 106 supported on the stationary backing plate 77 of the molding machine and extending through suitable clearance apertures in the platen 68 and the backing plate 74. As seen in FIG. 4, the actuating rods 104, 106 have just intercepted the backside of the ejection plate 96. Continued movement of the second mold means 60 in a downward direction toward its open position will result in a displacement of the ejection plate 96 to a position seen in phantom outline in the drawing and corresponding displacement of the side wall members 42 to their phantom outline positions like-wise seen in the drawing. It will be understood that the wall segments are displaced to the same elevation as the side wall segments.

Figure 6:
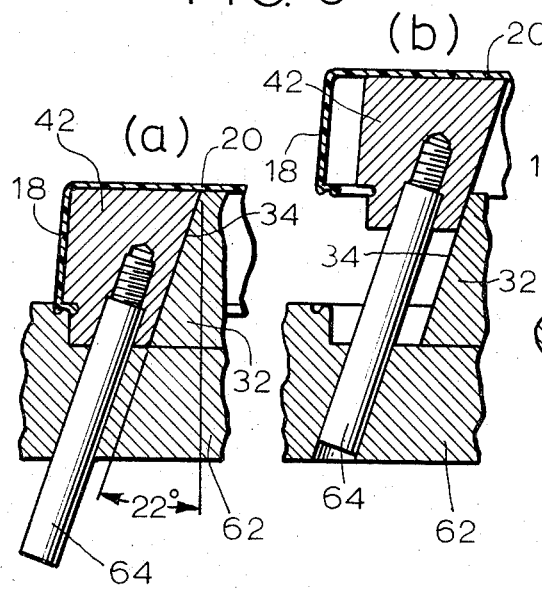
FIGS. 6a and 6b are detail sectional views taken along lines 6—6 of FIG. 5 and showing an element of the mold core in a closed and an open position, respectively.
Figure 7:
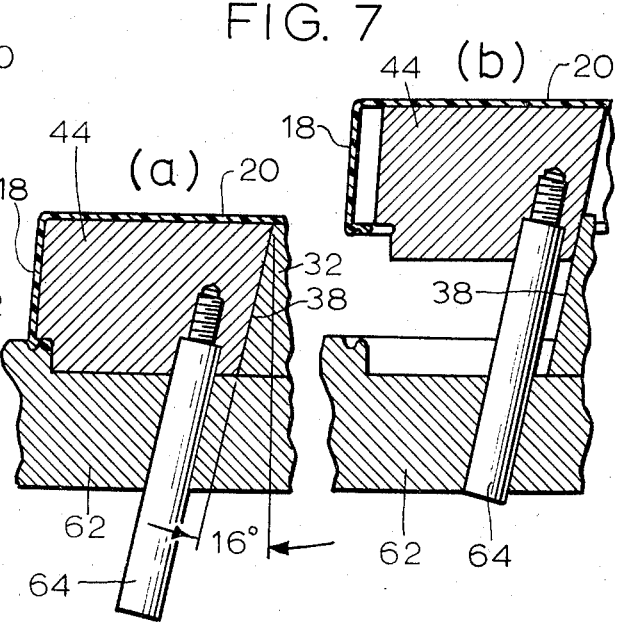
FIGS. 7a and 7b are detailed sectional views taken along lines 7—7 of FIG. 5 and again showing a core element of the mold in a closed and an open position, respectively.

The overall operation of the mold apparatus of the present invention may be appreciated by consideration of FIGS. 4, 6 and 7. As seen in FIG. 4, the mold is being opened under the influence of a conventional hydraulic molding press (not shown). Specifically, the second mold means 60 is moving downwardly relative to the stationary first mold means 50. At the location of the second mold means 60 shown in FIG. 4, the ejection plate 96 has just intercepted the stationary actuator rods 104, 106. Continued downward movement of the second mold means 60 results in a relative displacement of the ejection plate 96 toward the backside of the support platen 62. Through the medium of the interconnected pivotal linkages depicted by the exemplary linkage arm 98 in FIG. 4, each of the side wall and corner wall components of the mold core are displaced at equal longitudinal rates along the inclined slopes 34 and 38, respectively, of the fixed central core member 32. This, of course, results in an effective collapsing of the core to dimensions that permit it to be conveniently withdrawn from the constricted top opening of the mold article 10.

A clear understanding of the paths of movement of the side wall and corner wall components of the core mold means may be had by reference to FIG. 6 and 7, respectively. As shown in FIG. 6a, the side wall component 42 is in its closed or molding position, shown also in FIG. 4. Displacement of the ejection plate 96 to the phantom outline position FIG. 4 effects a corresponding displacement of the side wall member 42 to its inward or collapsed position as shown in FIG. 6b. It will be understood that each of the side walls 42 moves along the same path of movement as depicted in FIGS. 6a and 6b and that each is guided along that path by the guide rods 64 and the inclined side wall 34 of the central core member 32.

The movement of the corner wall portions 44 between their open and closed positions, is illustrated, respectively, in FIGS. 7a and 7b. It will be recognized that the movement pattern of the corner wall components is closely similar to that of the side wall components shown in FIGS 6a and 6b. However, as indicated in the drawing, the side wall portions 38 of the fixed core member 32 are inclined at a 16° angle rather than the 22° of side wall protions 34.

Once the article 10 seen in the phantom outline in FIG. 4 is moved clear of the mold, the mold press is actuated to return the mold to a fully closed position for repetition of the molding cycle. In this regard, the thermoplastic material for forming article 10 is introduced into the mold cavity through a primary inlet sprue and a series of inlet gates (not shown). The gating technique may be conventional and is omitted from the drawings for clarity in illustrating the present invention.

While particular embodiments of the present invention have beeen shown and described, it is apparent that various changes and modifications may be made, and it is therefore intended in the following claims to cover all such modifications and changes as may fall within the true spirit and scope of this invention.

I claim:

1. An injection mold for manufacture of a plastic article having a bottom wall and a plurality of side wall portions forming a generally hollow polygonal enclosure with an inwardly extending flange portion adjacent an open top of said article thereby to constrict said top opening, said mold comprising:

first mold means having a mold defining surface corresponding to the exterior surface dimensions of at least a portion of said article; and second mold means having a mold defining surface corresponding to the interior surface dimensions of said article and comprising a generally frustopyramidal central member having a plurality of side wall portions of a predetermined slope corresponding in number to said plurality of article side walls and having a plurality of corner wall portions located intermediate respective pairs of said central member side wall portions with said corner wall portions having a lesser slope than said side wall portions and further including side wall segments slidably movable along respective ones of each of said side wall portions, and corner wall segments slidably movable along respective ones of said corner wall portions, said side and corner wall segments each being movable from respective mold defining positions in which said segments cooperate with said central member to form said mold defining surface of said second mold means and a collapsed position in which said side and corner wall segments are displaced relative to said central member so that said second mold means is suffficiently reduced in size to permit it to be withdrawn from the constricted top opening of said plastic article.

2. The mold of claim 1 in which all of said corner wall segments in moving between their mold defining and collapsed positions follow paths having like predetermined lateral and longitudinal components and in which said side wall segments in moving between their mold defining and collapsed positions follow like paths having lateral and longitudinal components different from said predetermined components and further including ejection means comprising an ejection plate movable between first and second positions and separate mechanical linkage elements coupled between said ejection plate and said side wall and corner wall segments, said linkage elements being constructed and arranged for displacing said corner and side wall segments at a like longitudinal rate with movement of said ejection plate means between said first and second positions.

3. The mold of claim 1 in which said central member includes a top and a bottom wall and in which the planar projection of the line formed by the intersection of each of said corner walls and one of said adjacent side wall portions of said central member is parallel to the planar projection of the line formed by the intersection of the remaining adjacent side wall and the top wall of said central member.

4. The mold of claim 3 in which the included angle formed between each of said corner wall segments and said adjacent side wall segments is 45°.

5. The mold of claim 4 in which said second mold means includes four side wall and four corner wall portions, respectively, for defining a generally rectangular surface.

6. The mold of claim 5 in which the planar projections of the top and the bottom walls, respectively, of each of said corner wall segments defines respective right angle isosceles triangles.

* * * * *